No. 884,567.

PATENTED APR. 14, 1908.

R. BURGER.
DOUBLE WALLED VESSEL.
APPLICATION FILED OCT. 4, 1907.

Witnesses.
M. Gruberg
F. George Barry

Inventor.
Reinhold Burger
by attorneys

UNITED STATES PATENT OFFICE.

REINHOLD BURGER, OF BERLIN, GERMANY, ASSIGNOR TO AMERICAN THERMOS BOTTLE COMPANY, OF NEW YORK, N. Y., A CORPORATION OF MAINE.

DOUBLE-WALLED VESSEL.

No. 884,567.　　　　Specification of Letters Patent.　　　Patented April 14, 1908.

Application filed October 4, 1907. Serial No. 395,834.

*To all whom it may concern:*

Be it known that I, REINHOLD BURGER, a subject of the German Empire, and resident of Berlin, Germany, have invented a new and useful Improvement in Double-Walled Vessels, of which the following is a specification.

This invention relates to vacuum insulated vessels and has for its object to provide a novel device for spacing the inner and outer portions of the vessel apart at a distance from the mouth of the vessel so that the vessel may be reinforced at such point by the said device and thus reduce the liability of the vessel to become cracked or broken.

A further object is to provide a device of the above character in which a horizontally arranged ring is located in the space between the vertical walls of the inner and outer portions of the vessel, said ring having spacing blocks thereon of yielding non-conducting material, the said yielding blocks being compressed between the vertical walls of the inner and outer portions, so that they will be held permanently in position by friction only and without special holding means provided therefor either on the walls of the inner or outer portions or otherwise.

Figure 1:
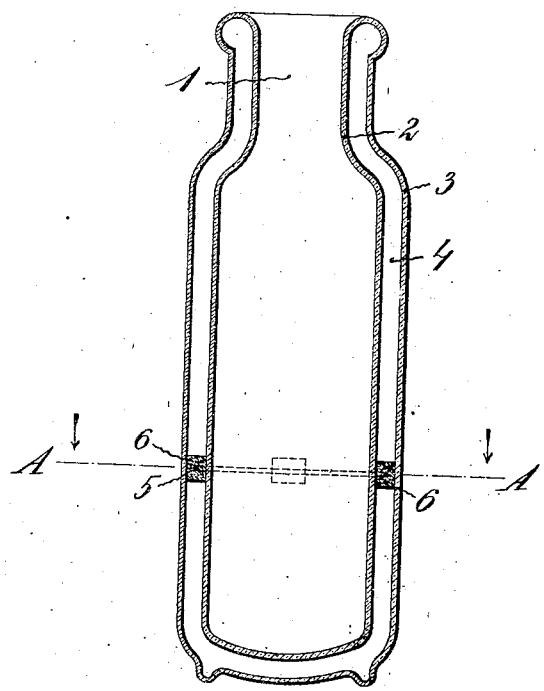
Figure 2:
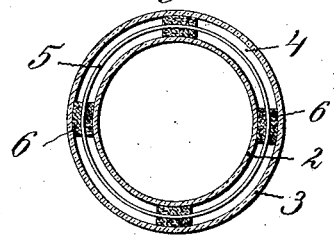
Figure 3:
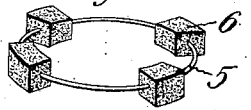

A practical embodiment of my invention is represented in the accompanying drawings, in which Figure 1 represents a vacuum insulated vessel with my improved spacing device applied thereto, Fig. 2 is a transverse section taken in the plane of the line A—A of Fig. 1, looking in the direction of the arrows, and Fig. 3 is a view in perspective of the spacing device.

The mouth of the vessel is denoted by 1, its inner portion by 2 and its outer portion by 3. The space 4 between the inner and outer portions of the vessel has the air exhausted therefrom to a greater or lesser degree thus forming a rarefied space between the said inner and outer portions for preventing the rapid change of temperature in the contents of the vessel. These inner and outer portions of the vessel are connected at the mouth thereof and are spaced apart at a distance therefrom to prevent undue vibrations in the inner wall of the vessel which would tend to crack or break the same, by my improved device, which device, in the present instance, comprises a ring 5 of fine wire, which encircles the inner wall of the vessel and is spaced from both the inner and outer walls by a plurality of yielding blocks 6 of non-conducting material, such, for instance, as asbestos, which blocks are compressed between the vertical walls of the inner and outer portions of the vessel with sufficient friction to hold the device in the position in which it is placed within the vessel, without the provision of supporting devices formed on the walls of the inner or outer portions of the vessel or by means attached to the said blocks.

What I claim is:—

1. A vacuum insulated vessel having its inner and outer portions connected at the mouth of the vessel, and a stiffening device interposed between the vertical walls of the inner and outer portions of the vessel for spacing them apart at a distance from the mouth of the vessel, said device being supported in position wholly by its frictional contact with the walls of the vessel.

2. A vacuum insulated vessel having its inner and outer portions connected at the mouth of the vessel and a stiffening device interposed between the vertical walls of the inner and outer portions of the vessel for spacing them apart at a distance from the mouth of the vessel, said device comprising a plurality of yielding spacing blocks compressed between and supported wholly by their frictional contact with the walls of the said vessel.

3. A vacuum insulated vessel having its inner and outer portions connected at the mouth of the vessel and a stiffening device interposed between the vertical walls of the inner and outer portions of the vessel for spacing them apart at a distance from the mouth of the vessel, said device comprising a ring and a plurality of yielding spacing blocks thereon compressed between and supported wholly by their frictional contact with the walls of the vessel.

In testimony, that I claim the foregoing as my invention, I have signed my name in presence of two witnesses, this 12th day of September 1907.

REINHOLD BURGER.

Witnesses:
　C. S. SUNDGREN,
　F. GEORGE BARRY.